United States Patent [19]

Kashigi

[11] Patent Number: 4,689,660
[45] Date of Patent: Aug. 25, 1987

[54] VIDEO SIGNAL STORAGE APPARATUS FOR NTSC SYSTEM

[75] Inventor: Kazuo Kashigi, Tokyo, Japan

[73] Assignee: NEC Corporation, Japan

[21] Appl. No.: 844,360

[22] Filed: Mar. 26, 1986

[30] Foreign Application Priority Data

Mar. 30, 1985 [JP] Japan .................................. 60-64978

[51] Int. Cl.⁴ ................................................ H04N 9/76
[52] U.S. Cl. ........................................ 358/11; 358/22; 358/21 R; 358/13
[58] Field of Search .................... 358/11, 12, 21 R, 22, 358/30, 13

[56] References Cited

U.S. PATENT DOCUMENTS 4,599,611 7/1986 Bowker ................................ 358/22
4,602,275 7/1986 Smith ................................... 358/11
4,639,765 1/1987 D'Hont ................................ 358/11

Primary Examiner—Michael A. Masinick
Attorney, Agent, or Firm—Ostrolenk, Faber, Gerb & Soffen

[57] ABSTRACT

A television video signal storage apparatus for storing an NTSC digital chrominance signal so as to facilitate further processing thereof. The signal is sampled at a sampling frequency 2n times the subcarrier frequency, whereby it contains 2n data for each cycle of the subcarrier, of which n data are a first polarity portion and n data are an opposite polarity portion. The apparatus includes a first inverter for inverting the polarity of n successive data corresponding to the opposite polarity portion of the digital chrominance signal, such that all of said 2n data have the same polarity; a memory for storing the modified signal; and a second polarity inverter for inverting the polarity of the n successive data corresponding to the opposite polarity portion of the modified signal as it is read out of the memory. Thus, the signal read out of the memory corresponds to the input digital chrominance signal. The digital chrominance signal may be provided by a Y/C separator which also provides a luminance signal, the latter being stored in a separate memory. In this case, the two memories may be controlled commonly by a single address generator or may be commonly controlled by separate writing address and reading address generators. The first and second polarity inverters may be controlled for reading data into and out of the chrominance signal memory with the same phase or with different phase.

15 Claims, 11 Drawing Figures

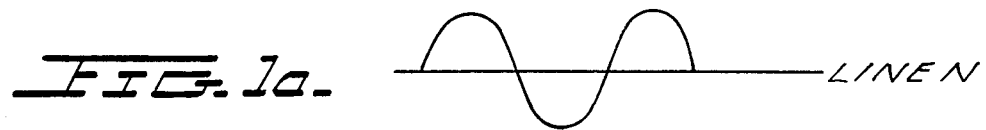
FIG. 1a. — LINE N
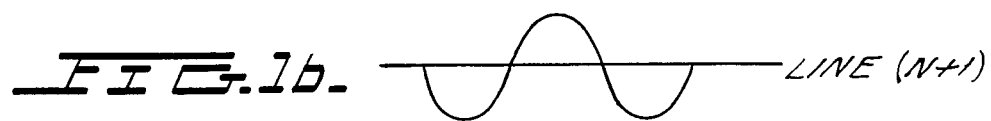
FIG. 1b. — LINE (N+1)
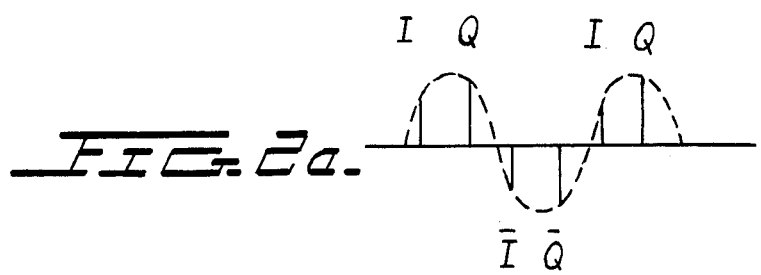
FIG. 2a.
FIG. 2b.
FIG. 3.
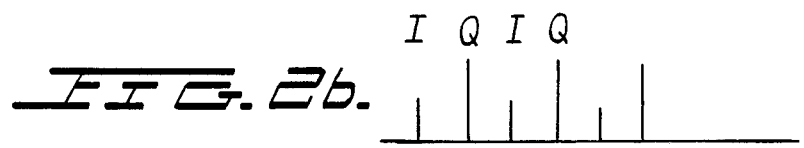

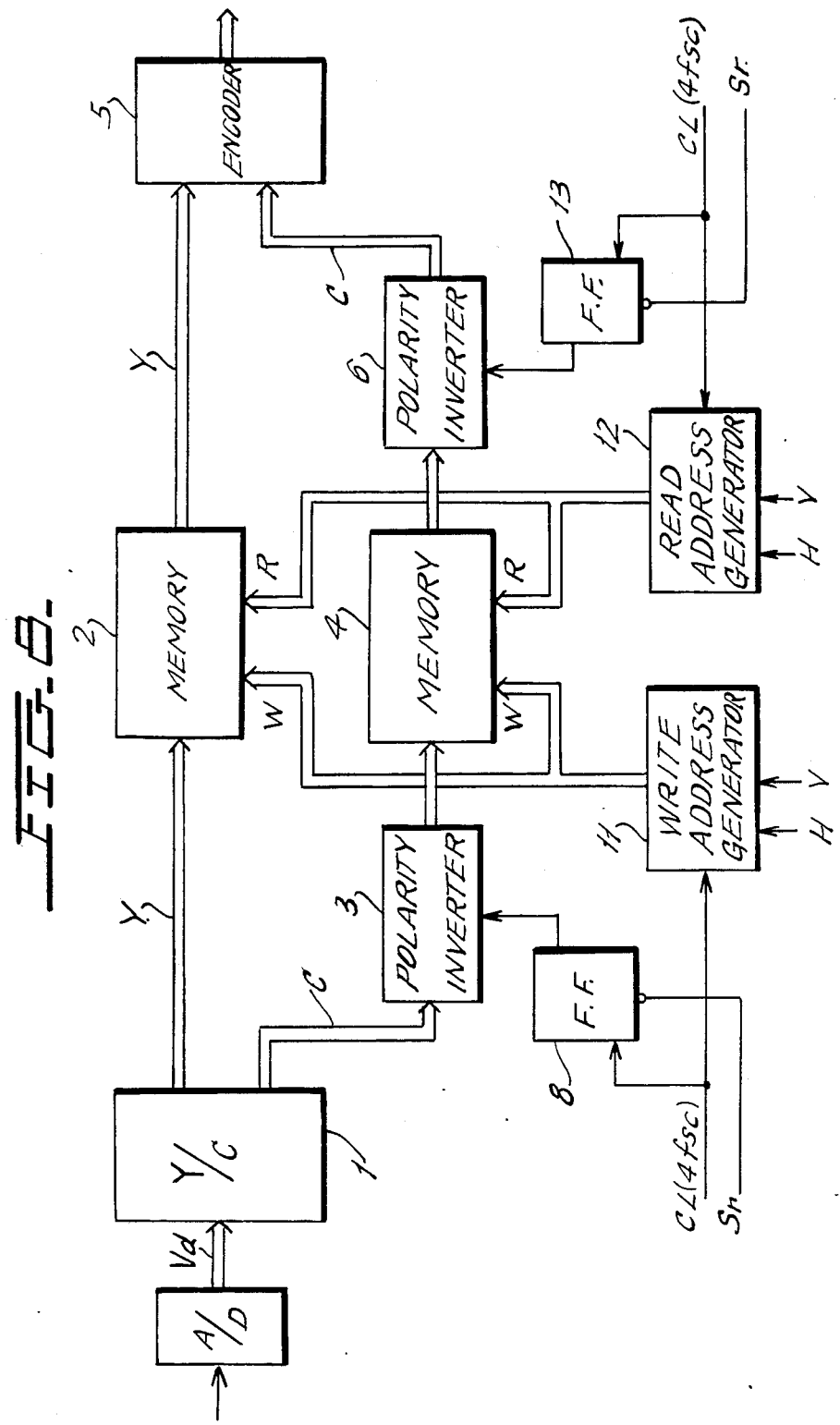

VIDEO SIGNAL STORAGE APPARATUS FOR NTSC SYSTEM

BACKGROUND OF THE INVENTION

The present invention relates to a video signal storage apparatus for the NTSC system which stores a digitized NTSC video signal and which is suited for use in a video signal special effect apparatus.

By using a video signal apparatus, it has been attempted to produce many special picture effects by controlling writing addresses or reading addresses of the video signal storage apparatus while suppressing, compressing and expanding, for example. In this case, conventionally, it is impossible to directly carry out interpolation processing or the like processing between two adjacent lines and between two adjacent television frames having the composite signal form since the phase of the color subcarrier is different between the two adjacent lines and between the two adjacent frames. Therefore, according to the prior art, a composite video signal is separated into three component signals, i.e., a luminance (Y) signal, an I signal and a Q signal, and, then processing, such as interpolation processing, is individually carried out on each component signal. In this case, the I and Q signals constitute the components of a chrominance (C) signal. Thereafter, the processed component signals are encoded and recombined into the composite signal form.

As described above, according to the prior art, since the color subcarrier in the composite video signal has a different phase in the two adjacent lines and frames, it is necessary to use three independent memory configurations for the Y, I and Q signals when such computation processing between two adjacent lines or between two adjacent frames is required.

SUMMARY OF THE INVENTION

An object of the present invention is to provide a video signal storage apparatus which is capable of storing I and Q signals in a memory without first dividing them.

Another object of the present invention is to provide a video signal storage apparatus which enables direct computation processing between two adjacent lines and between two adjacent frames.

According to the present invention, there is provided a television video signal storage apparatus for storing a digital chrominance signal of an NTSC system video signal, the digital chrominance signal being sampled at a sampling frequency 2n-times the frequency of the subcarrier and containing 2n data for each cycle period of the subcarrier, comprising: a first polarity inverter for inverting the polarity of n successive data of said digitial signal among 2n data such that all of said 2n data have the same polarity; a memory for storing the polarity-inverted digital signal delivered from the first polarity inverter; and a second polarity inverter for inverting the polarity of n successive data of the polarity-inverted digital signal read out from the memory.

BRIEF DESCRIPTION OF THE DRAWINGS

FIGS. 1(a) and 1(b) are diagrams illustrating a phase of a color subcarrier of two adjacent lines;

FIG. 2(a) is a diagram showing sampling of a color subcarrier on ±I and ±Q axes to extract I and Q signals;

FIG. 2(b) is a diagram showing the inversion of the polarity of the $\bar{I}$ and $\bar{Q}$ signals;

FIG. 3 is a diagram showing the I and Q signals stored into a memory as contemplated by the present invention;

FIG. 8 is a block diagram illustrating a second embodiment of the present invention.

PREFERRED EMBODIMENTS OF THE INVENTION

The principles of the invention will now be described. With reference to a television signal of the NTSC system, the color subcarrier in which I and Q signals are multiplexed has a phase difference of 180 degrees between adjacent lines as shown in FIGS. 1(a) and 1(b). In sampling the color subcarrier at sampling frequency four times the a subcarrier frequency, furthermore, it is well known that the I signal and Q signal of the chrominance (C) signal can be efficiently extracted, respectively, when the sampling timing is coincident with the ±I and ±Q axes of a color vector plane as shown in FIG. 2(a). In this case, however, the sampled chrominance signal output follows a pattern such as I, Q, $\bar{I}$, $\bar{Q}$,—(wherein the sign "—" above a signal indicates the opposite polarity) as shown in FIG. 2(a). If the chrominance signal is to be operated upon by way of interpolation processing or the like between the adjacent lines, opposite polarities between the adjacent lines make it difficult to directly perform the computation operation.

If the polarities of the $\bar{I}$ and $\bar{Q}$ signals in the chrominance signal are inverted, the sampled chrominance signal output then follows a pattern such as I, Q, I, Q,—in FIG. 2(b). If the chrominance signal as shown in FIG. 2(b) in which the $\bar{I}$ and $\bar{Q}$ signals are polarity-inverted is then written into a memory, the I and Q signals are stored in an alternating arrangement as shown in FIG. 3. Accordingly, when the I and Q signals are stored as shown in FIG. 3, it becomes possible to perform direct computation operations between adjacent lines and between adjacent frames. This feature eliminates the need to separate the I and Q signals and store them independently.

Figure 4:
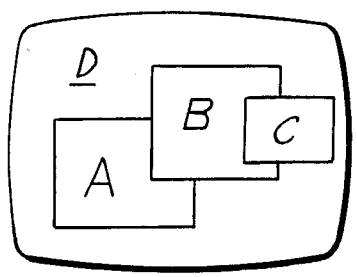
FIG. 4 shows an example of a special effect wherein a plurality of images are overlapped on a television screen.

The ability to direct computation operations between two frames means that when a plurality of images A, B, C and D are displayed on the television screen in an overlapped manner as shown in FIG. 4, it is possible to store plural video signals corresponding to the images A, B, C and D into a common frame memory without consideration of any phase difference between the respective color frames among the plural video signals, which is a very great advantage.

Figure 5:
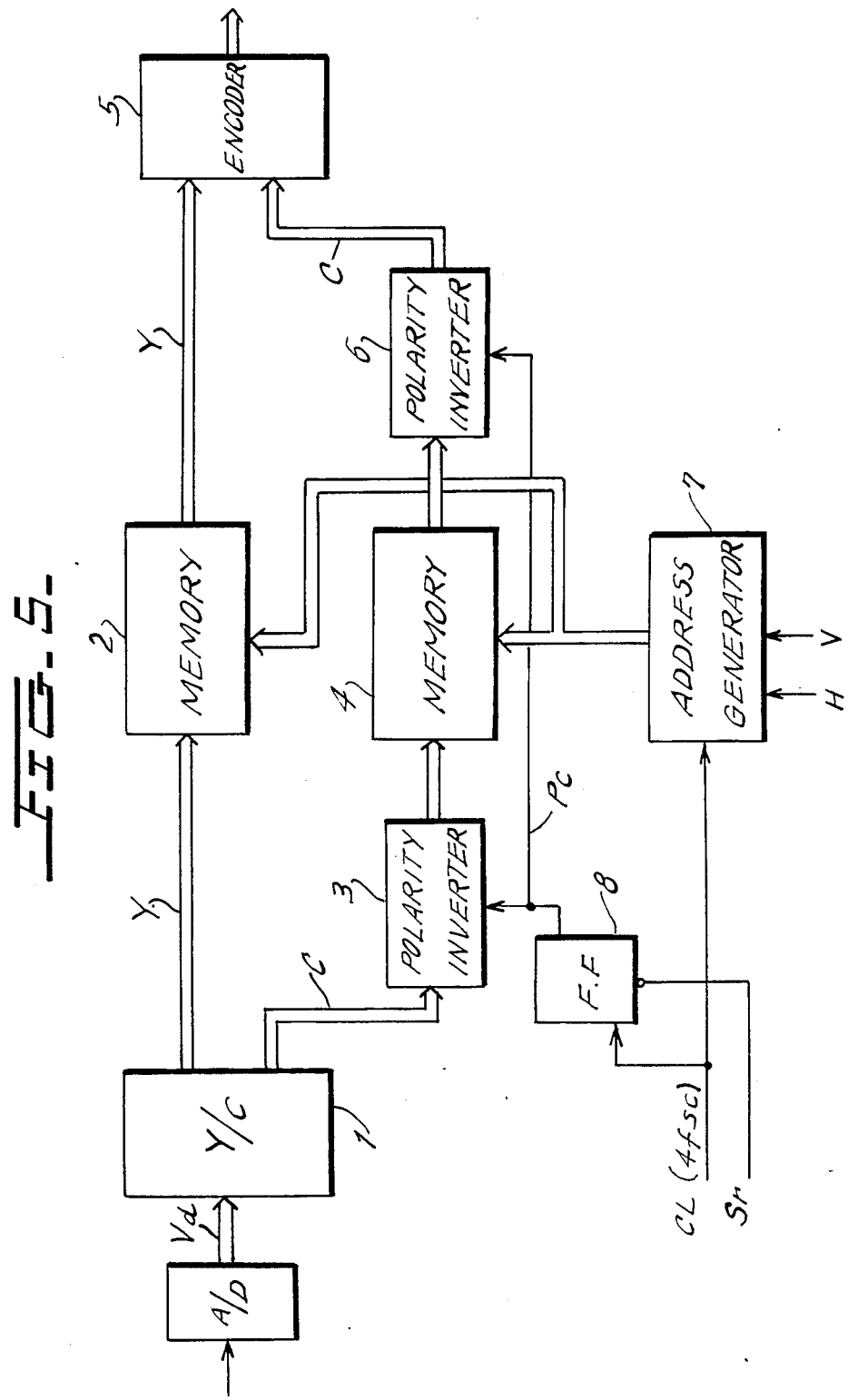
FIG. 5 is a block diagram illustrating a first embodiment of the present invention.

In a first embodiment of the present invention shown in FIG. 5, a digitized video signal Vd is supplied to a Y/C separator 1 to separate a luminance (Y) signal and a chrominance (C) signal therefrom. In this case, the digitized video signal Vd is produced by sampling at a frequency four times as great as the subcarrier frequency and the sample points are coincident with ±I and ±Q axes of a color vector plane. The Y signal separated by the Y/C separator 1 is supplied to a memory 2 and is stored therein. On the other hand, the C signal is supplied to a polarity inverter 3 in which the polarity of the $\bar{I}$ and $\bar{Q}$ signals is inverted. Therefore, the C signal delivered from the polarity inverter 3 is modified as shown in FIG. 2(b), and is written into a memory 4. The Y signal read out from the memory 2 is sent to an encoder 5. The C signal read out from the memory 4 is polarity-inverted again by a polarity inverter 6 to return it to the form as shown in FIG. 2(a), and then, is sent to the encoder 5. The encoder 5 combines the Y signal and the C signal from the polarity inverter 6 to produce a composite video signal. Write addresses and read addresses for the memories 2 and 4 are generated by an address generator 7.

Figure 6:
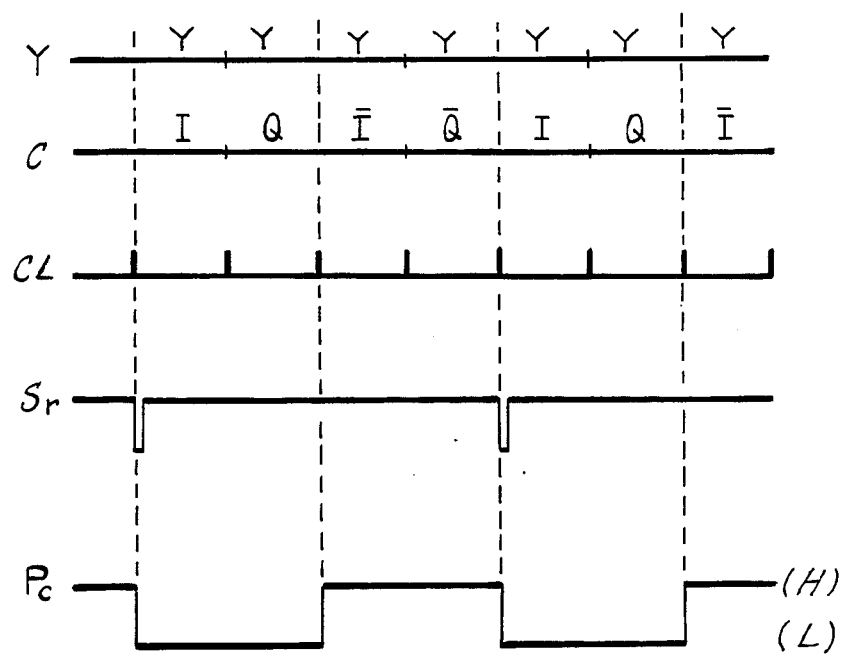
FIG. 6 shows timing charts to illustrate the operation of the embodiment shown in FIG. 5.

A flip-flop 8 produces a polarity inversion control signal indicating inversion timings for the polarity inverters 3 and 6. To this end, the flip-flop 8 receives a clock signal having the same frequency as the sampling signal (namely a frequency four times that of the subcarrier frequency), and is reset every period of the subcarrier by a reset signal Sr. FIG. 6 shows timing charts of the Y signal, the C signal, the clock signal CL, the reset signal Sr, and the polarity inversion control signal Pc. The polarity of the chrominance signal is inverted when the polarity inversion control signal Pc has the high level. The polarity inversion control signal Pc has a cycle period that is the same as that of the subcarrier, and the phase of the reset signal Sr is so determined that the polarity of the $\bar{I}$ and $\bar{Q}$ signals is inverted.

Figure 7A:
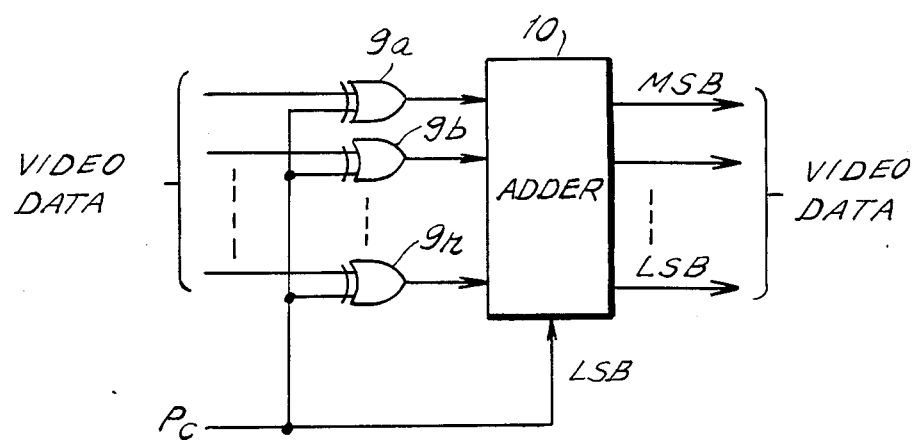
FIGS. 7(a) and 7(b) are block diagrams showing examples of a polarity inverting circuit in the embodiment of FIG. 5.
Figure 7B:
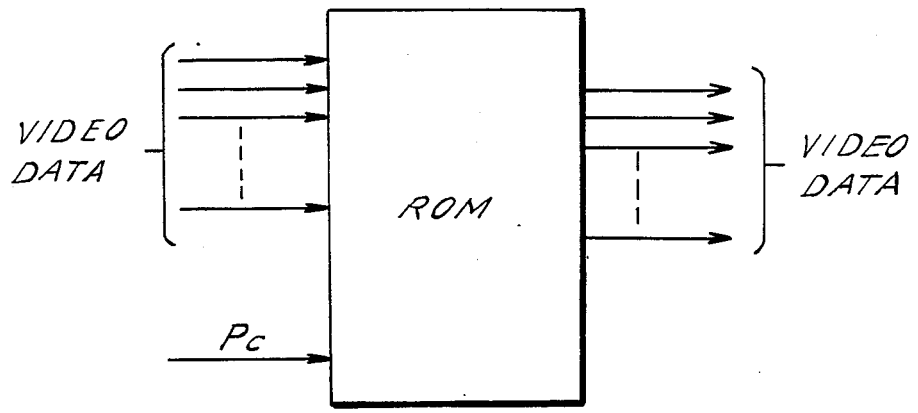

With respect to the form of the data of the chrominance (C) signal a polarity inversion result may be obtained by a two's complement operation. Therefore, the bits constituting the data should be inverted, i.e., "0" should be inverted to "1" and "1" should be inverted to "0", and "1" (LSB) should be added. FIG. 7(a) is a block diagram showing a circuit for obtaining the two's complement, which consists of exclusive OR gates 9a to 9n, and an adder 10. The polarity inverter can also be realized easily by using a read-only memory (ROM) as shown in FIG. 7(b).

In the preceding embodiment, the polarity inversion control signal Pc is commonly supplied to the polarity inverters 3 and 6. However, when the $\bar{I}$ and $\bar{Q}$ signals to be inverted are to have different timings on the writing side and the reading side, of the memory a delay circuit for timing compensation may be inserted in a polarity inversion control signal line for the polarity inverter 6. It is also possible to provide independent polarity inversion control signals for the writing side of the memory and the reading side. FIG. 8 is a block diagram illustrating a second embodiment of the present invention, which is different from the first embodiment in that a write address generator 11 and a read address generator 12 are independently provided for addressing 2 and 4. Furthermore, in this case, the polarity inversion control signal to be supplied to a polarity inverter on the reading side is generated by a flip-flop 13 independently of the flip-flop 8 on the writing side.

In the embodiments of a present invention, the frequency four times the subcarrier frequency is used as the sampling frequency in a digitizing process, and the sampling points are positioned at the ±I and ±Q axes of the color vector plane. However, according to the present invention, when the chrominance signal is stored into the memory, the separation of the I and Q signals from the chrominance signal is not required as described above. Accordingly, the present invention can be applied whenever an analog television signal is sampled by an optical sampling frequency 2n-times the subcarrier frequency. In this case, 2n data are delivered during each one cycle period of the subcarrier, and the successive n data (the half of 2n data) having an opposite polarity are polarity-inverted so that all of 2n data have the same polarity.

According to the present invention as described above, an input video signal can be writted into a memory at any position of the memory irrespective of line numbers or color frames. That is, the writing operation can be performed without consideration of the line numbers or the color frames. This presents a great advantage for providing a practical circuit configuration. As illustrated in FIG. 5, furthermore, the address generator can be commonly used for both the memory for the Y signal and the memory for the C signal. Moreover, only one memory is required for storing the chrominance signal, i.e., both the I and Q signals.

Although illustrative embodiments of the invention have been described herein, it is to be understood that the invention is not limited to such embodiments, but rather other modifications and variations of the invention are possible within the scope of the invention, as limited only by the claims.

What is claimed is:
1. A video signal storage apparatus for storing a video signal having a subcarrier frequency, comprising:
   digitizing means for delivering a first digital signal in response to such video signal by digitizing such video signal at a sampling frequency 2n-times (n: integer) the subcarrier frequency, said first digital signal containing 2n data for each cycle period of the subcarrier frequency;
   first polarity inverting means for receiving said first digital signal and delivering a modified digital signal wherein the polarity of n consecutive data of said 2n data of said first digital signal are inverted such that all of said 2n data of said modified digital signal have the same polarity;
   memory means coupled to said first polarity inverting means for receiving, storing and reading out said modified digital signal; and
   second polarity inverting means coupled to said memory means for receiving said modified digital signal and inverting the polarity of n consecutive data of said 2n data of said modified digital signal read out from said memory means to deliver a second digital signal which is substantially the same as said first digital signal.

2. An apparatus as in claim 1, wherein said digitizing means comprises a Y/C separator for delivering a digital luminance signal, and said first digital signal being a digital chrominance signal delivered by said Y/C separator.

3. An apparatus as in claim 2, further comprising second memory means for receiving, storing, and reading out said digital luminance signal.

4. An apparatus as in claim 3, further comprising addressing means for commonly addressing both said first-mentioned memory means and said second memory means for writing data therein.

5. An apparatus as in claim 4, further comprising second addressing means for commonly addressing both said memory means for reading out data therefrom.

6. An apparatus as in claim 2, said digital chrominance signal comprising I and Q components being commonly received by said first polarity inverting means for being converted into said modified digital signal and stored in said memory means.

7. An apparatus as in claim 6, wherein said I and Q components each include a first polarity portion and an opposite polarity portion, and said n consecutive data inverted by said first polarity inverting means correspond to said opposite polarity portion.

8. An apparatus as in claim 7, said first and opposite polarity portions each corresponding to a respective half-cycle of said subcarrier frequency, and further comprising timing means for timing said first polarity inverting means to invert only said n data of said first digital signal during the half-cycle corresponding to said opposite polarity portion.

9. An apparatus as in claim 8, further comprising second timing means for timing said second polarity inverting means such that said second digital signal is different in phase from said first digital signal.

10. A storage apparatus for storing a digitized chrominance signal of the NTSC system, said digitized chrominance signal having a subcarrier frequency and being expressed by a train of data, said storage apparatus comprising:
    first inverting means for inverting the polarity of data of said digitized chrominance signal during a half cycle of the subcarrier frequency to deliver a modified digitized chrominance signal;
    memory means coupled to said first inverting means for storing said modified digitized chrominance signal; and
    second inverting means coupled to said memory means for inverting the polarity of data of said modified digitized chrominance signal read out from said memory means during a half cycle of the subcarrier frequency.

11. A storage apparatus as claimed in claim 10, further comprising control means for producing a polarity control signal for determining the respective half cycle of said subcarrier during which said first and second inverting means invert said respective signals.

12. An apparatus as in claim 11, wherein said control means further produces a second polarity control signal, said first-mentioned and second polarity control signals being for controlling said first and second polarity inverting means and having the same frequency but different phase.

13. An apparatus as in claim 12, wherein said second polarity control signal is a delayed signal in synchronism with said first-mentioned polarity control signal.

14. A storage apparatus for storing a digitized chrominance signal of the NTSC system, said digitized chrominance signal being expressed by a train of data and having a subcarrier frequency, said data being sampled by a sampling frequency 2n-times (n: integer) as great as said subcarrier frequency, said storage apparatus comprising:
    writing address generating means synchronized with said digitized chrominance signal for generating a writing address in synchronism with said sampling frequency; first control signal generating means for generating a first control signal indicating a period of a half cycle of the subcarrier frequency in synchronism with said digitized chrominance signal;
    first inverting means for inverting the polarity of n data of said digitized chrominance signal in response to said first control signal to deliver a modified digitized chrominance signal;
    memory means for storing said modified digitized chrominance signal in response to said writing address;
    reading address generating means receiving a reference signal for generating a reading address in synchronism with said reference signal, said modified digital chrominance signal being read out from said memory means in response to said reading address;
    second control signal generating means for generating a second control signal indicating a period of a half cycle of the subcarrier in synchronism with said reference signal; and
    second inverting means coupled to said memory means for inverting the polarity of n data of said modified digitized chrominance signal read out from said memory means in response to said second control signal.

15. An apparatus as in claim 14, wherein said digitized chrominance signal and modified digitized chrominance signal each have a first polarity portion and an opposite polarity portion, each of said portions corresponding to a respective half-cycle of the subcarrier frequency, said first and second control signals controlling said first and second inverting means to invert only data corresponding to said opposite polarity portions.

* * * * *